Figure 1:
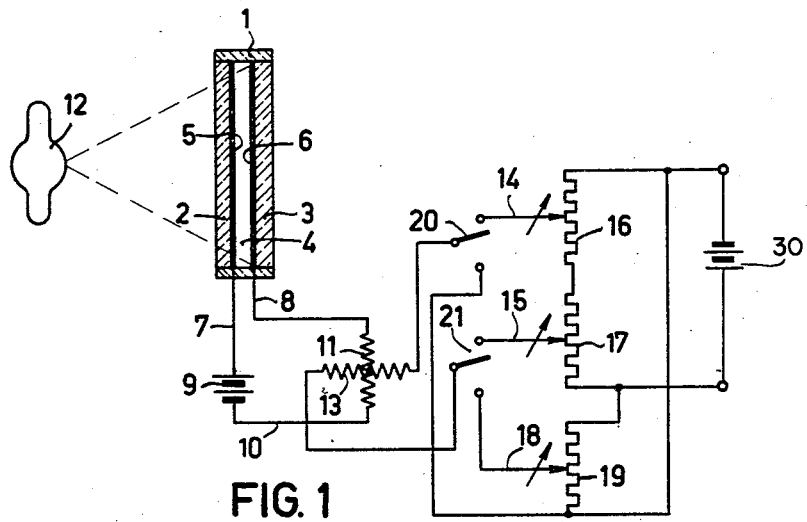

Oct. 6, 1964  W. J. OOSTERKAMP ET AL  3,152,255

DEVICE FOR MEASURING THE X-RAY RADIATIONS ABSORBED BY A SPECIMEN

Filed July 21, 1960

INVENTOR
Wijbe J. Oosterkamp.
Klaas Reinsma.
Jan Hesselink.
BY

AGENT

United States Patent Office 3,152,255
Patented Oct. 6, 1964

3,152,255
DEVICE FOR MEASURING THE X-RAY RADIA-
TIONS ABSORBED BY A SPECIMEN
Wijbe Johannes Oosterkamp, Klaas Reinsma, and Jan
Hesselink, all of Eindhoven, Netherlands, assignors to
North American Philips Company, Inc., New York,
N.Y., a corporation of Delaware
Filed July 21, 1960, Ser. No. 44,375
Claims priority, application Netherlands July 24, 1959
16 Claims. (Cl. 250—95)

This invention relates to X-ray measuring apparatus and, more particularly, to means for measuring the X-ray radiaitons absorbed by a specimen.

Generally, X-ray measurements are made by measuring radiation exposure by means of, for example a flat ionisation chamber positioned in the beam of X-rays and having an active surface area larger than the cross-sectional area of X-ray beam, the ionisation current being supplied to a measuring instrument designed for measuring an amount of electricity. Such devices for measuring the irradiation dose are utilized in radiography as, for example, in diagnostic X-ray examination, both for X-ray screening and for taking X-ray photographs, the latter being generally known as fluoroscopy and photofluoroscopy, respectively.

Hitherto, the biological effects produced by X-rays has often been related to the irradiation dose. It is well known; for example, see "Report of the United Nations Scientific Committee on the Effects of Atomic Radiation," New York, 1958; that different types of radiation, which includes X-rays, "produce biological effects by means of the same physical process, namely energy transfer," and "radiation passing through matter without energy transfer produces no effect." As further stated in the report the "biological effect of a given type of radiation depends upon the energy absorbed in," i.e. the energy transferred to the medium which is irradiated. Thus, a more distinct relationship is likely to exist between a biological effect and the irradiation dose. An object of the invention is to determine the absorbed dose in a simple manner.

It is known, that the summation of the energy absorption imparted to the irradiated matter is regarded as the absorbed dose. The summation, however, is inefficacious for practical use, i.e. measurement, and may be avoided by testing the relationship which exists between the irradiation dose and the absorbed dose. By means of a measuring device specially designed for this purpose, it has already been proved that the absorbed dose is approximately proportional to the irradiation dose. With the use of the results of such a test, it is possible to deduce the amount of the absorbed dose from the irradiation dose. For this purpose, the indication of the measuring instruments used in the specially designed measuring device, referred to above, is first obtained and then separately multiplied by a given value or multiplication factor.

As is well known, the quality of X-ray radiations refers to their penetration ability and is related to the wavelength of the energy being radiated. Therefore, for a given ionisation chamber and associated measuring instrument, the multiplication factor is independent of the intensity of the X-ray beam if the quality of the rays, which is proportional to the electrode voltage set up at the X-ray tube and/or to the filter, if one is used, in front of the aperture of emergence of the tube, is not varied. Thus, for a given quality of the rays, it would be possible to calibrate the measuring instrument in conventional units of absorbed energy. However, for other combinations of filter and tube voltage, the quality of the rays and hence the absorbed energy will vary so that the measuring instrument requires correction. Consequently, if the voltage and the filter are known, it is possible to determine the absorbed dose by multiplying the result of a measurement by a value corresponding to the quality of the rays. This, however, requires considerable attention, since with each variation of the voltage and/or use of a different filter another correction factor must be introduced to compensate for the changes in quality of the X-rays. This involves even greater difficulty when the radiography examination comprises an X-ray screening which is immediately followed by photographing.

Another object of the invention, therefore, is to avoid the disadvantage of requiring a separate measurement and a separate correction for determining the absorbed dose by providing an X-ray measuring apparatus that provides a direct indication of the absorbed dose.

Accordingly, this invention features, inter alia, an X-ray measuring apparatus for measuring X-ray measuring apparatus for measuring X-ray radiation absorbed by a specimen which comprises an ionisation chamber which, in response to the X-ray radiation, provides an ionisation current proportional thereto. In addition, means to integrate the ionisation current are provided which, in coaction with at least one control means that provides a signal proportional to the quality of the X-rays produced by a given source of X-rays, provides the absorbed radiation measurement. In this manner, the measuring result is dependent not only upon the ionisation current and the duration of the irradiation, but also upon each adjustment or combination of adjustments of the control means, as will become apparent hereinafter.

Other features of this invention are to provide a control means having a first member whose adjusting positions are correlated with the positions of the voltage selector which adjusts the voltage of the X-ray tube in cases where no filter or a filter of a given characteristic is utilized, and/or a second member having adjusting positions to adjust for different filter characteristics in cases where different filters are utilized.

An X-ray device designed for X-ray screening and photographing usually comprises means for rapidly switching over from one operational condition to the other. The operating voltage of the tube frequently differs considerable in each case, thus requiring renewed adjustment of the control member for the adjustment of the voltage. In order to avoid delay, it is preferable to provide a third control member, the adjustment of which is chosen in conformity with the position of the voltage selector in X-ray screening operation.

Figure 2:
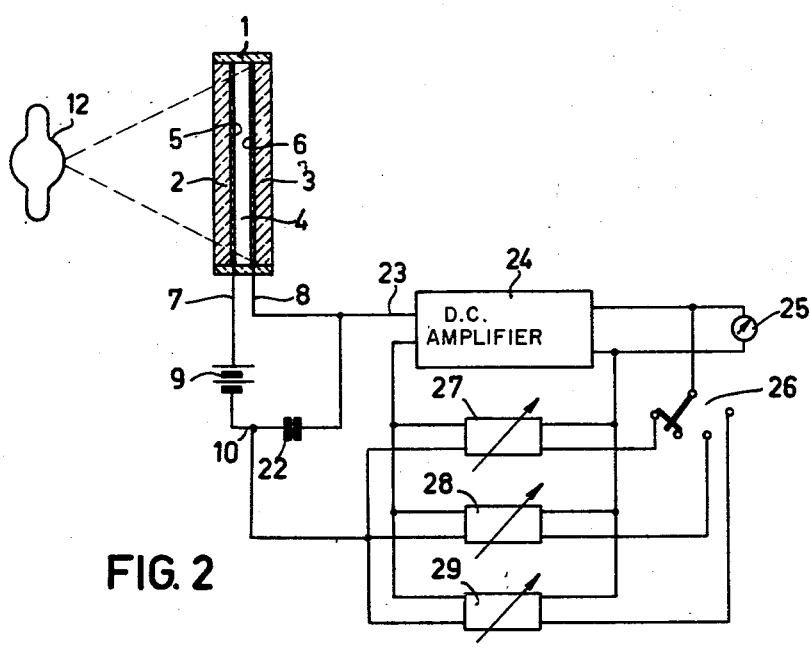

In order that the invention may be readily carried into effect, two embodiments thereof will now be described in detail, by way of example, with reference to the accompanying diagrammatic drawing, in which:

The above-mentioned and other features and objects of this invention will become apparent by reference to the following description taken in conjunction with the accompanying drawing, in which:

FIG. 1 is a schematic diagram of the X-ray measuring apparatus of this invention and, more particularly, of an embodiment utilizing an electrical integrating meter therein; and FIG. 2 is a schematic diagram of another embodiment of this invention, illustrated partly in block form, utilizing electronic integrating and measuring means.

Referring to FIGURE 1, the ionisation chamber 1 may be of a conventional design and, for example, comprises two flat walls 2 and 3 of insulating material which are positioned in parallel and separated by a small interspace 4. The adjacent sides of the walls 2 and 3 are covered with conductive layers 5 and 6, respectively. The chamber may communicate with the surroundings or be filled with air of a different pressure or with another ionising gas.

Two current supply conductors 7 and 8 are connected to the conductive layers 5 and 6. The conductor 7 is connected to one terminal of a direct voltage source 9, of which the other terminal is connected by means of a conductor 10 to a current coil 11 of an electrical integrating meter, as for example a kilowatthour (kwh.) meter. The other end of the coil 11 is connected by means of conductor 8 to the second conductive layer 6. Upon irradiation of the ionisation chamber 1 by means of X-rays originating from an X-ray tube 12, a flow of ions is produced in the chamber which is dependent upon the intensity of rays and the current thus produced traverses the current coil 11 of the meter.

A voltage coil 13 of the meter is connected to movable contact arms 14 and 15 of two series connected potentiometers 16 and 17. The potentiometers may be connected to either the terminals of the voltage source 9 or any other voltage source which delivers a suitable voltage. A suitable source of voltage is illustrated by the battery 30 connected across potentiometers 16 and 17 in FIG. 1. The contact arm 15 serves as a control member which is adjustable to deliver a voltage either proportional to the tube voltage or at least unambiguously correlated thereto. The contact arm 14 serves as a control member for adjusting a voltage dependent upon the filter, not shown, chosen in the beam of X-rays of the X-ray tube 12. It is obvious that, if the X-ray measuring apparatus is contemplated to be operated with a source of X-rays comprising only the tube 12, or a source of X-rays comprising the tube 12 and a filter having the same characteritsic, then only a single control member would be required. As illustrated in FIG. 1, however, by provision of a second control member, viz. adjustable contact arm 14, the X-ray measuring apparatus may operate with filters of different characteristics as the arm 14 may be adjusted or positioned accordingly to provide a voltage proportional to the characteristic of the filter selected. The indication of the kwh. meter is thus determined by the ionisation current, the duration of the irradiation and the quality of the rays.

A separate contact member 18, with adjustable positions, of a potentiometer 19 may be connected to the voltage coil of the meter by placing switches 20 and 21 in their alternate positions. The contact member 18 is adjusted to deliver a voltage proportional to the intensity of the X-rays during X-ray screening, i.e., fluoroscoping, operation. During this operation, member 18 need not be accompanied by a second contact member because it, generally, is not necessary to use some filter or other similar filtering means when X-ray screening.

The circuit of the measuring device shown in FIGURE 2 operates electronically and is illustrated by way of example as comprising a similar ionisation chamber to that described above. One conductive layer 5 is connected by means of conductor 7 to the voltage source 9. The second conductive layer 6 of the ionisation chamber 1 is connected by means of conductor 8 to one electrode of a capacitor 22 and by means of a conductor 23 to one terminal of the input of a direct-voltage amplifier 24. Conductor 10 completes the circuit by connecting the other terminal of capacitor 22 to the negative terminal of voltage source 9. The charge accumulated on capacitor 22 will thus be proportional to the ionization current produced by chamber 1, as well as to its duration. Connected to the output circuit of amplifier 24 is a moving-coil meter 25. The direct-current amplifier 24 is provided with feedback circuits 27, 28, 29, the lower output terminals of which are connected together and to the common junction of voltage source 9 and capacitor 22. The upper terminals of feedback circuit 27, 28 and 29 are also connected together and are further connected to the other input terminal of amplifier 24. In this manner a portion of the amplifier output voltage is fed back through the capacitor 22 to the input in degenerative coupling. By varying the negative feedback, the amplification factor and hence the output voltage of the amplifier are varied.

Each of the degenerative couplings can be adjusted individually. The negative feedback circuit 27 may be made operative by means of a selector switch 26. The circuit 27 is utilised in X-ray screening operations and is adjusted to provide a correction for the voltage at capacitor 22 which is dependent upon the selected tube voltage.

The other positions of the selector switch 26 establish connections to the feedback circuits 28 and 29. The circuit 28 functions to adjust the correction factor correlated to the tube voltage when taking photographs. The feedback circuit 29 is used when a filter is employed in the beam of rays to provide a correction voltage which is proportional to the characteristic of the particular filter utilized. The last-mentioned circuits may, alternatively, be placed in operation simultaneously, as appears from the adjusting arm of the selector switch which, in the extreme right-hand position, connects the two contacts coupled to the feedback circuits 28 and 29, respectively.

Ordinarily, if the charging voltage of capacitor 22 is measured alone by means of the moving-coil measuring instrument 25, the measured signal would indicate, assuming the quality of the X-rays were correct, the energy for ionising the medium in chamber 1. However, in combination with the adjustable amplification of the direct-current amplifier 24, the voltage measured is a measure of the energy absorbed.

Thus, while we have described above the principles of our invention in connection with specific apparatus, it is to be clearly understood that this description is made by way of example only and not as a limitation to the scope of our invention as set forth in the objects thereof and in the accompanying claims.

We claim:

1. X-ray measuring apparatus for measuring the energy absorbed by a specimen irradiated by a source of X-rays comprising an ionisation chamber arranged in the path of the X-rays and responsive to the X-ray radiations to provide an ionisation current proportional thereto, means coupled to said ionization chamber for integrating said ionisation current over a time interval proportional to the time of exposure of said specimen to said X-rays, and at least one control means for providing a correction signal proportional to the quality of the X-ray radiations of said source to correct said integrating means to provide said absorbed radiation measurement.

2. X-ray measuring apparatus according to claim 1 wherein said means for integrating comprises an electric integrating meter having a current coil connected to carry said ionisation current and a voltage coil coupled to said control means so as to sense said correction signal, and said control means comprises an adjustable voltage source adjustable in accordance with the quality of the X-ray radiations produced thereby to provide said correction signal.

3. X-ray apparatus according to claim 1 wherein said integrating means comprises a capacitor charged by said ionisation current and amplifier means coupled to said capacitor, and said control means comprises adjustable feedback means associated with said amplifier and adjustable in accordance with the quality of the X-ray radiations produced thereby to provide said correction signal.

4. X-ray measuring apparatus for measuring the energy absorbed by a specimen irradiated by a source of X-rays, said source comprising an X-ray tube and filter means associated therewith, said filter means being adapted to be placed in the path of said X-ray radiations, said means for measuring comprising an ionisation chamber responsive to the X-ray radiation to provide an ionisation current proportional thereto, means coupled to said ionization chamber for integrating said ionisation current over a time interval proportional to the time exposure of said specimen to said X-rays, first control means for providing a first correction signal proportional to the energy of the X-ray radiations of said tube to correct said integrating means to provide said absorbed radiation measurement, and second control means for providing a second correction signal proportional to the transmission characteristic of said filter means to correct further said integrating means whenever said filter means is placed in said path.

5. X-ray measuring apparatus according to claim 4 wherein said means for integrating comprises an electric integrating meter having a current coil connected to carry said ionisation current and a voltage coil coupled to said first and second control means so as to sense the correction signals, and said first and second control means comprise adjustable first and second voltage sources, respectively, to provide the respective first and second correction signals.

6. X-ray apparatus according to claim 4 wherein said integrating means comprises a capacitor charged by said ionisation current and amplifier means coupled to said capacitor, and said first and second control means comprise first and second adjustable feedback means, respectively, associated with said amplifier to provide the respective first and second correction signals.

7. In radiographic apparatus having a source of X-rays for producing X-ray radiations for fluoroscopic and photofluoroscopic examination of a specimen, said source comprising an X-ray tube for providing X-ray radiations having a quality proportional to the tube voltage of said tube and filter means associated therewith adapted to be placed in the path of said X-ray radiations to attenuate predetermined wavelengths of said X-ray radiations proportional to the attenuation characteristic of said filter means, means for measuring the X-ray radiation absorbed by said specimen comprising an ionisation chamber responsive to the X-ray radiations to provide an ionisation current proportional thereto, means coupled to said ionization chamber for integrating said ionisation current over a time interval proportional to the time of exposure of said specimen to said X-rays, first control means for providing a first correction signal proportional to the tube voltage of said tube to correct said integrating means to provide said absorbed radiation measurement during said fluoroscopic examinations, a second control means for providing a second correction signal proportional to the tube voltage of said tube to correct said integrating means to provide said absorbed radiation measurement during said photofluoroscopic examinations, means to actuate selectively said first control means during said fluoroscopic examination and said second control means during said photofluoroscopic examination, and third control means for providing a third control signal proportional to said filter means characteristic to correct further said integrating means whenever said filter means is placed in said path.

8. Radiographic X-ray apparatus according to claim 7 wherein each of said control means is adjustable.

9. Radiographic X-ray apparatus according to claim 7 wherein said means to integrate comprises an electrical integrating meter having a current coil adapted to carry said ionisation current, and a voltage coil adapted to sense said correction signals, and said first, second, and third control means comprise adjustable first, second, and third voltage sources, respectively, to provide the respective said first, second, and third correction signals.

10. Radiographic X-ray apparatus according to claim 7 wherein said integrating means comprises a capacitor charged by said ionisation current and amplifier means coupled to said capacitor, and said first, second, and third control means comprise first, second, and third adjustable feedback means, respectively, associated with said amplifier to provide the respective said first, second, and third corerction signals.

11. X-ray measuring apparatus comprising a source of X-rays producing a beam of X-ray radiations for examination of a specimen, and means for measuring the X-ray radiation absorbed by said specimen comprising radiation sensitive means arranged to intercept said beam and convert said radiation into an electrical current proportional to the intensity of said radiations, means for integrating said current over a time interval proportional to the time of exposure of said specimen to said source of X-rays, control means for providing a correction signal proportional to the quality of the X-ray radiations of said source, means for applying said correction signal to said integrating means thereby providing automatic compensation of said integrating means for variations in the quality of said X-rays, and indicating means responsive to said integrating means for indicating the absorbed radiation measurement.

12. Apparatus according to claim 11 wherein said X-ray source comprises an X-ray tube and said control means comprises an adjustable voltage source adjustable in accordance with the value of voltage applied to said tube thereby providing a correction signal correlated to said tube voltage.

13. X-ray measuring apparatus for measuring the energy absorbed by a specimen irradiated by a source of X-rays, said source comprising an X-ray tube and filter means associated therewith, the quality of the X-ray radiations being variable in accordance with the voltage of said tube and the wavelength filtering characteristic of said filter means, said filter means being arranged to be placed in the path of said X-ray radiations thereby to attenuate predetermined wavelengths of said radiations, means for measuring the X-ray radiation absorbed by said specimen comprising radiation sensitive means arranged to intercept said radiations and convert same into an electrical current proportional to the intensity of said radiations, indicating means responsive to said radiation sensitive means comprising means for integrating said current over a time interval proportional to the time of exposure of said specimen to said source of X-rays, first control means for providing a first correction signal proportioinal to said tube voltage thereby to correct said integrating means, second control means for providing a second correction signal proportional to the characteristic of said filter means to further correct said integrating means whenever said filter means is placed in said path, and means for applying said first and second correction signals to said integrating means whereby said indicating means indicates the energy absorbed by said specimen.

14. Apparatus as described in claim 4 wherein said means for integrating comprises an electric integrating meter having a current coil connected to carry said ionization current and a voltage coil coupled to said first and second control means so as to sense the correction signals, and said first and second control means comprises adjustable first and second voltage sources, respectively, serially connected so as to provide the respective first and second correction signals, said first adjustable voltage being adjustable in accordance with the anode voltage of said X-ray tube and said second adjustable voltage being adjustable in accordance with the transmission characteristic of said filter means.

15. X-ray measuring apparatus for measuring the energy absorbed by a specimen irradiated by a source of X-rays, comprising an X-ray tube for providing a beam of X-ray radiations, means for measuring the radiation absorbed by said specimen comprising radiation sensitive means arranged to intercept substantially all of the energy of said X-ray beam and convert said radiation into an electric signal dependent upon the intensity of said radiation and substantially independent of the quality of said radiations, means coupled to said radiation sensitive means for integrating said electrical signal over a time interval determined by the time of exposure of said specimen to the beam of X-rays, adjustable control means for providing a control voltage which is determined by the quality of said radiations, and means for applying said control voltage to said integrating means, said integrating means providing an output indication indicative of the energy absorbed by said specimen which is determined by the intensity of said radiations, the exposure time of said specimen and the quality of said radiations.

16. Apparatus as described in claim 15 wherein said radiation sensitive means comprises an ionization chamber positioned in the path of said X-ray beam and having an active surface area of sufficient size to intercept the entire beam of X-ray radiations, said electric signal being comprised of the ionization current producted by said chamber, and said integrating means comprising a time integrating power meter having a current coil connected to carry said ionization current and a voltage coil having applied thereto said control voltage.

References Cited in the file of this patent
UNITED STATES PATENTS

| | | |
|---|---|---|
| 2,379,125 | Weisglass | June 26, 1945 |
| 2,499,953 | Herzog | Mar. 7, 1950 |
| 2,537,914 | Roop | Jan. 9, 1951 |
| 2,796,527 | Oosterkamp et al. | June 18, 1957 |
| 2,909,666 | Godbarsen | Oct. 20, 1959 |
| 2,948,812 | Quinn | Aug. 9, 1960 |
| 2,953,702 | Zieler | Sept. 20, 1960 |
| 3,001,074 | Reider | Sept. 19, 1961 |